United States Patent [19]

Klinger

[11] Patent Number: 5,497,919

[45] Date of Patent: Mar. 12, 1996

[54] CARRYING CASE FOR USE WITH A BICYCLE

[75] Inventor: Paul D. Klinger, Westminster, Colo.

[73] Assignee: Schwinn Cycling & Fitness Inc., Boulder, Colo.

[21] Appl. No.: 305,194

[22] Filed: Sep. 13, 1994

[51] Int. Cl.⁶ .................................. B62J 7/02; B62J 9/00
[52] U.S. Cl. .................. 224/32 R; 224/151; 190/109; 383/2
[58] Field of Search ........................ 190/103, 104, 190/105, 109, 111, 112; 150/144, 114, 116, 117; 224/32 R, 30 R; 383/2, 38, 39, 40, 120

[56] References Cited

U.S. PATENT DOCUMENTS

| | | | |
|---|---|---|---|
| 558,728 | 4/1896 | Hasselberger | 150/114 |
| 1,101,490 | 6/1914 | Geissler | 150/117 |
| 2,562,499 | 7/1951 | Lifton | 190/111 |
| 2,827,096 | 3/1958 | Hinson | 190/111 |
| 2,851,076 | 9/1958 | Stakofsky | 150/117 |
| 3,122,225 | 2/1964 | Ward | 190/109 |
| 4,059,207 | 11/1977 | Jackson et al. | 224/32 R |
| 4,236,615 | 12/1980 | Ginat | 190/103 |
| 4,345,703 | 8/1982 | Allen | 224/32 A |
| 4,359,233 | 11/1982 | Jackson et al. | 224/32 R |
| 4,830,154 | 5/1989 | Gerch et al. | 190/103 |
| 4,887,751 | 12/1989 | Lehman | 190/103 |
| 4,921,151 | 5/1990 | Duvall | 224/32 A |
| 4,974,765 | 12/1990 | Marchetto et al. | 224/32 R |

FOREIGN PATENT DOCUMENTS

| | | | |
|---|---|---|---|
| 2697224 | 4/1994 | France | 224/32 R |
| 2080220 | 2/1982 | United Kingdom | 190/103 |

OTHER PUBLICATIONS

Catalog p. 4, along with front cover page and rear cover page of catalogue identified as Bushwacker USA containg a copyright notice with the year 1993 and believed to be published as early as Jun. 1993.

*Primary Examiner*—Andres Kashnikow
*Assistant Examiner*—Gregory M. Vidovich

[57] ABSTRACT

A carrying case for use with a bicycle comprises a receptacle defined by a pair of side walls, a pair of end walls and a bottom wall. A lid is hingedly connected to the receptacle. At least one pouch is secured to a side wall of the receptacle, the pouch being defined by a cover which is hingedly secured to the receptacle along a bottom edge is proximity to the bottom wall of the receptacle. An expandable container is foldable within the pouch and opens to a fully expanded condition when the cover is hinged open through 180 degrees. The volume of the carrying case is greatly increased when the pouch and container are fully opened.

9 Claims, 4 Drawing Sheets

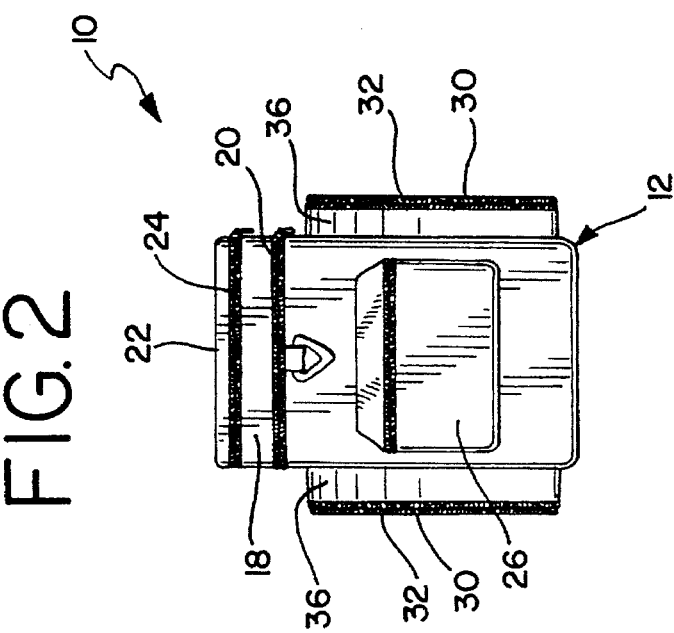
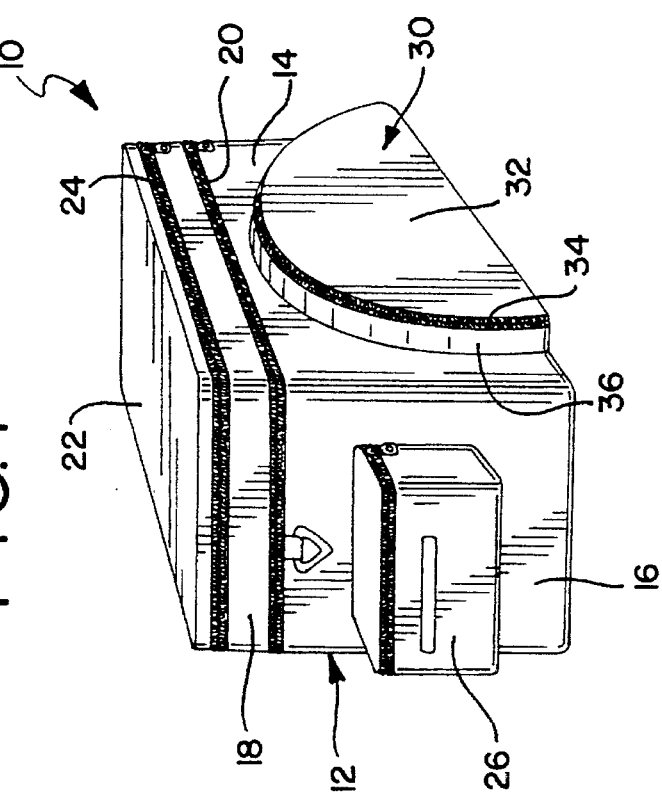

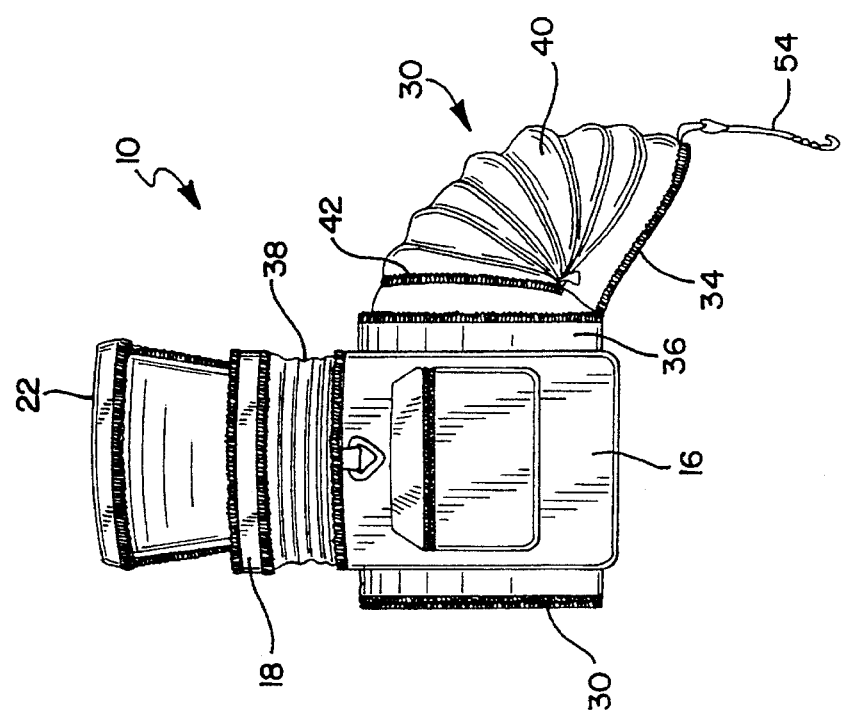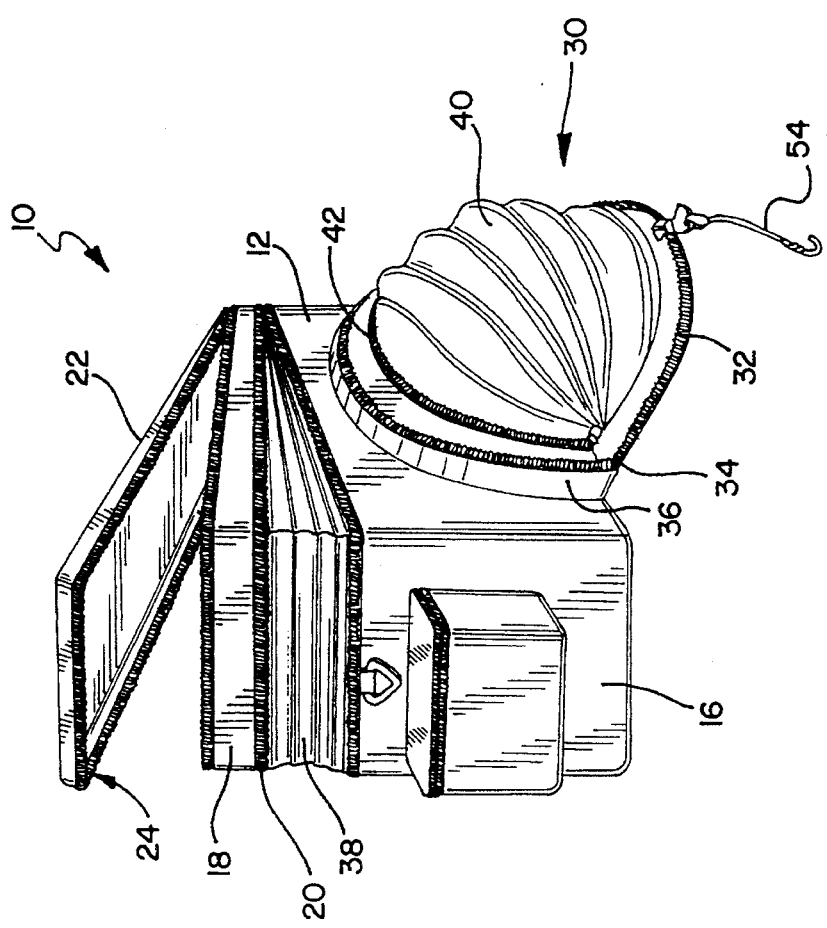

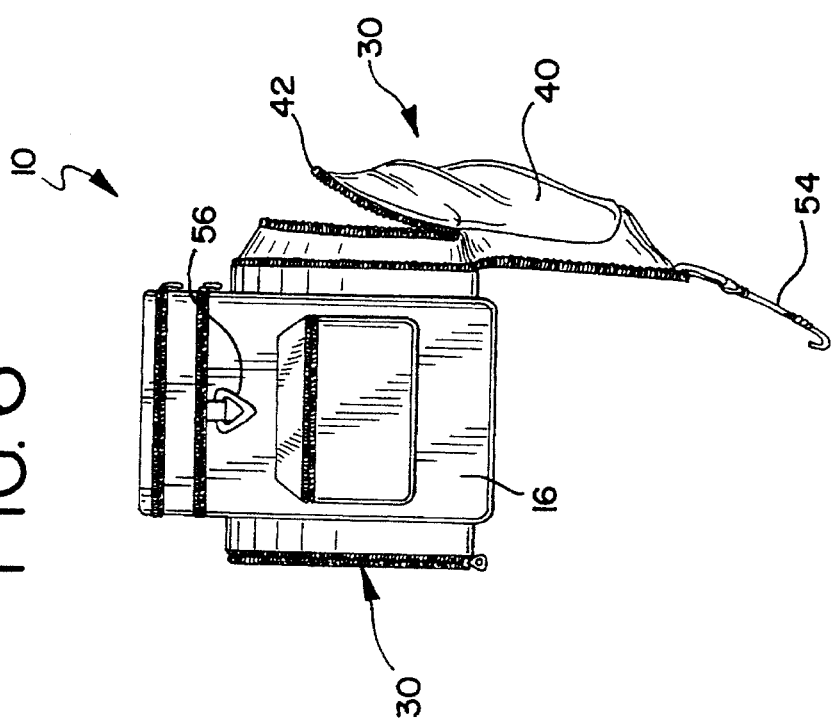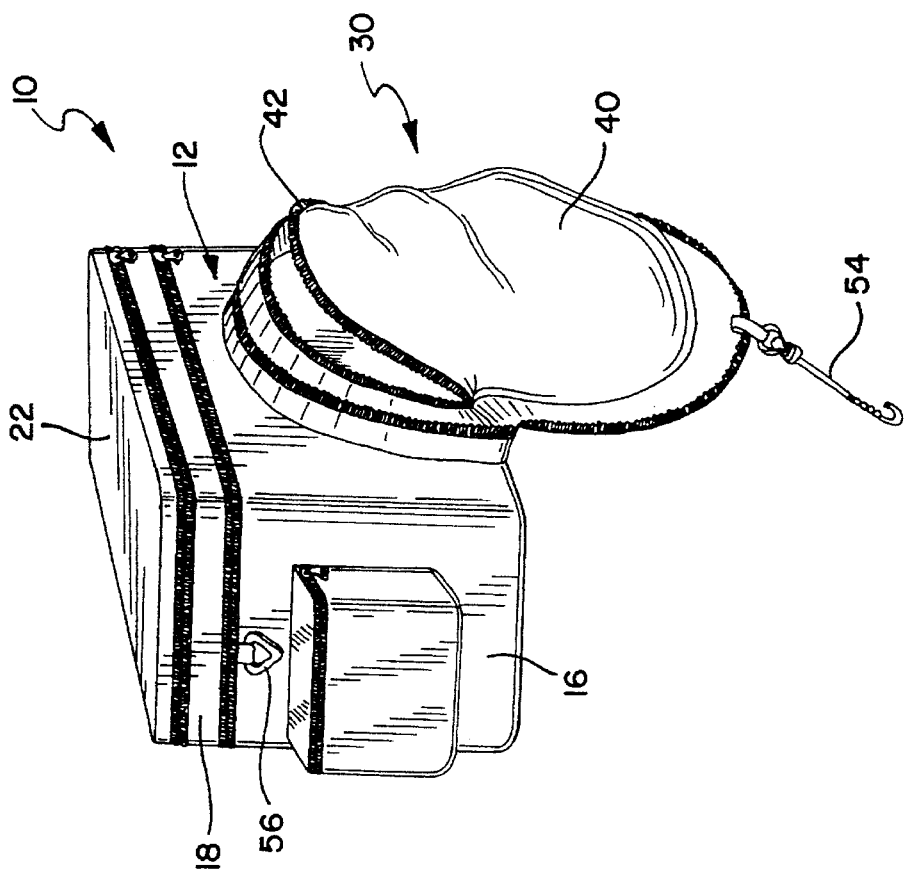

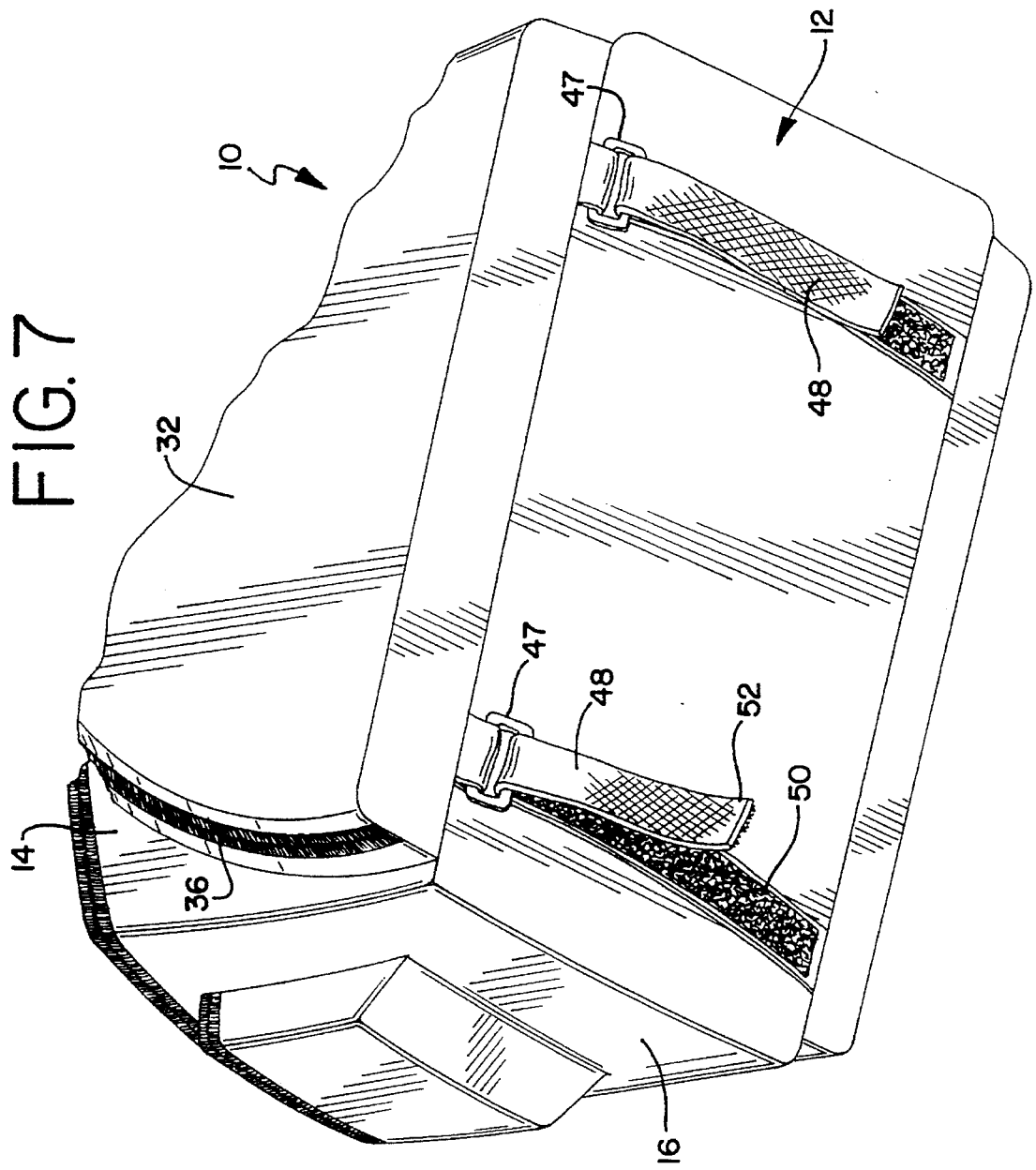

5,497,919

CARRYING CASE FOR USE WITH A BICYCLE

BACKGROUND OF THE INVENTION

1. Field of the Invention

The present invention relates generally to carrying cases for storing and carrying personal items and it relates more particularly to a carrying case which may be conveniently secured to a rack on a bicycle and thereby allow the bicycle rider to store and transport personal items while riding for pleasure.

2. Description of the Prior Art

Bicycle riding as a leisure time activity is a sport which has long been popular among persons of all ages. Many parks and recreational areas have been designed with specially designated bicycle paths for scenic bicycle rides. In recent times, the mountain bike has become popular as a means for pleasure riding. This type of bicycle is rugged in construction and often has a multiple-gear drive train which permits the bicycle to be used in the most rugged, off-the-road terrain. Many bicyclists use mountain bikes to take short sight seeing trips and enjoy nature in out-of-the-way places.

In order to equip themselves for bicycle trips, it is common for bicyclists to install racks on their bicycles to hold and transport provisions and other personal items. One such rack consists of a frame structure bolted to the bicycle over the front or rear wheel. The rack provides a means for strapping items to the bicycle without interfering with its operation. Moreover, bicyclists have been accustomed to using luggage-like carrying cases for storing and transporting personal items such as cameras, field glasses, food and the like. Typically, a bungie cord may be used to strap the case to the rack of a bicycle. However, carrying cases have become available with specially designed straps for strapping the case to a bicycle rack.

In order to better accommodate the needs of the bicyclist, it is desirable to provide a carrying case which is specially designed for use with a bicycle. It is further desirable to provide a bicycle carrying case which is expandable so that the bicyclist can use the case to store either a small number or a relatively large number of personal items. Still further it is desirable to provide such a case which will not interfere with the safe operation of the bicycle.

SUMMARY OF THE INVENTION

The present invention overcomes the disadvantages of the prior art by providing a carrying case for use with a bicycle comprising a receptacle defined by a pair of side walls, a pair of end walls and a bottom wall. A lid is hingedly connected to the receptacle. At least one pouch is secured to a side wall of the receptacle, the pouch being defined by a cover which is hingedly secured to the receptacle along a bottom edge in proximity to the bottom wall of the receptacle. An expandable container which is foldable within the pouch opens to a fully expanded condition when the cover is hinged open through 180 degrees. The case may also have a collar connected to the upper edge of the receptacle. The collar can be connected to an expandable liner such that the volume of the receptacle is increased when the collar is detached and lifted upwardly from the receptacle.

BRIEF DESCRIPTION OF THE DRAWINGS

The foregoing and other novel features of the invention will be better understood from a reading of the following detailed description taken in conjunction with the accompanying drawings wherein:

FIG. 1 is a front perspective view of a carrying case for use with a bicycle and constructed in accordance with the invention;

FIG. 2 is a front elevational view thereof;

FIG. 3 is a front perspective of the carrying case with the lid partially open, the receptacle expanded and a side pouch partially open;

FIG. 4 is a front elevational view of the case shown in FIG. 3;

FIG. 5 is a front perspective view showing a side pouch fully open;

FIG. 6 is a front elevational view of the case shown in FIG. 5; and

FIG. 7 is a partial bottom perspective view of the case.

DETAILED DESCRIPTION OF THE PREFERRED EMBODIMENTS

Referring now to the drawings, and initially to FIGS. 1 and 2, a carrying case for use with a bicycle is designated generally by the reference numerals 10 and comprises a main receptacle 12 having a generally rectangular shape in plan. The receptacle 12 is defined by a pair of side walls 14 and pair of end walls 16, only one of which can be seen. Coextensive with the upper edges of the side and end walls is a collar 18 attached on three sides by a suitable zipper 20. The fourth, or rear side of collar 18, is hingedly connected to the rear end wall 16 of the receptacle 12 (not shown). A lid 22 is hingedly connected along an edge thereof to the rear side of the collar 18. The other three edges of the lid 22 are secured to the collar 18 by a zipper 24. The receptacle 12 is preferably provided with a forward pouch 26 for containing small personal items such as keys. In accordance with the invention, each side wall 14 of the receptacle 12 is provided with a pouch 30 comprising a cover 32, a zipper 34 and flange 36.

Turning now to FIGS. 3 and 4, the case 10 is illustrated in a partially open condition. The lid 22 is shown partially opened by being unzipped from the collar 18. The collar 18 is also unzipped from the rest of the receptacle 12, exposing a liner 38. The liner 38 is secured between the collar 18 and inside receptacle walls 14 and 16 and when fully expanded permits the case to have increased volumetric capacity. Also, one of the side pouches 30 is shown partially opened by being unzipped from its flange 36 exposing a container 40 which was folded within the pouch 30 in FIGS. 1 and 2. The container 40 is connected on one end to the inside cover 32 of the pouch 30. At its other end, the container is closed by a suitable zipper 42. Referring to FIGS. 5 and 6, the case 10 is shown with a pouch 30 in a fully open condition. The cover 32 of the pouch 30 has been essentially hinged 180 degrees downward from its closed, zipped condition. These FIGS. illustrate that the volumetric capacity of the case 10 can be greatly increased with the pouches 30 fully opened.

It can now be appreciated that the case 10 of the present invention provides a highly effective means for storing and transporting personal items when traveling on a bicycle. Because of its rectangular elongated overall shape, the case 10 is readily suitable to be strapped to a typical bicycle rack of the type mounted over either the front or rear wheel of the bicycle. FIG. 7 illustrates the type of straps which may be used to secure the case 10 to the rack. At each two corners adjacent bottom wall 46 of the receptacle 12, D-rings 47 may be secured to the receptacle 12 together with straps 48 having hook and loop fastening means 50 and 52, respectively. The straps 48 and D-rings 47 cooperate very effectively to strap the case 10 to the rack of a bicycle.

In the construction of the case 10, it is preferred to form the receptacle 12 from suitable polyester material with the container 40 and liner 38 formed from nylon. Also, as shown in the Figures, the pouch 30 is preferably semicircular in shape as to have a smooth overall contour when in the open condition. The cover 32 of the pouch 30 in the preferred embodiment has a rigid plastic core. Therefore, when the pouch 30 is opened, it will not accidentally interfere with the bicycle wheel when it hangs down from the bicycle rack. A suitable stretch cord and hook assembly 54 attached to the cover 32 of the pouch 30 allows the cover 32 to be tethered to the bicycle rack when in the open condition. Suitable rings 56 may also be provided for attachment of a shoulder strap (not shown) so that the case may be conveniently carried when not secured to the bicycle.

While the present invention has been described in connection with particular embodiments thereof, it will be understood by those skilled in the art that many changes and modifications may be made without departing from the true spirit and scope of the present invention. Therefore, it is intended by the claims to cover all such changes and modifications which come within the true spirit and scope of this invention.

What is claimed is:

1. A carrying case for use with a bicycle, said case comprising:

a receptacle means adapted to be mounted to the bicycle, said receptacle means including at least one side wall;

at least one pouch having a compartment separate from said receptacle means secured to said one side wall, said pouch comprising a substantially flexible cover being movable between open and closed positions and having an upper edge substantially adjacent said side wall when said cover is in said closed position and a bottom edge wherein said bottom edge is hingedly secured to said one side wall and a foldable container, said foldable container having a first portion connectable to said one side wall and a second portion connected to said cover proximate said upper edge and being foldable between a folded condition and an unfolded, fully expanded condition corresponding with said closed and open positions, respectively;

wherein upon opening of said cover between said closed and open position through an arc of substantially 180 degrees with respect to said one side wall causes said foldable container to open to said fully expanded condition; and said cover including a relatively rigid material disposed therein whereby when said foldable container is in said fully, expanded position, said cover will not accidently interfere with operation of the bicycle when mounted thereon.

2. The case of claim 1 wherein said receptacle means has an upper edge and includes a collar which is coextensive with and detachably connectable to the upper edge.

3. The case of claim 2 wherein a lid is connected to said collar.

4. The case of claim 2 wherein said collar is further connected to an expandable liner said liner being connected to said receptacle means.

5. The case of claim 4 wherein said liner expands the volume of said receptacle means said collar is detached and lifted upwardly from said receptacle means.

6. The case of claim 1 further comprising straps along bottom edges of the receptacle means for securing said case to a rack of the bicycle, 7. The case of claim 1 wherein said cover is semicircular in shape.

8. The case of claim 1 further including a tether secured to said cover for tethering the cover in said open position to the frame of the bicycle.

9. The carrying case of claim 1 wherein said receptacle means includes two side walls wherein each of said sidewalls has at least one of said pouches secured thereto, respectively.

* * * * *

UNITED STATES PATENT AND TRADEMARK OFFICE
CERTIFICATE OF CORRECTION

PATENT NO. : 5,497,919
DATED : March 12, 1996
INVENTOR(S) : Paul D. Klinger

It is certified that error appears in the above-indentified patent and that said Letters Patent is hereby corrected as shown below:

Column 4, claim 5, line 26, after "means", add --when--.

Signed and Sealed this

Twenty-third Day of July, 1996

Attest:

BRUCE LEHMAN

*Attesting Officer*   *Commissioner of Patents and Trademarks*